United States Patent [19]
Bjurel et al.

[11] Patent Number: 6,137,810
[45] Date of Patent: Oct. 24, 2000

[54] TELECOMMUNICATION METHOD AND SYSTEM

[75] Inventors: Jonas Bertil Bjurel, Bromma; Erik Anders Stenkvist, Bandhagen, both of Sweden

[73] Assignee: Telefonaktiebolaget LM Ericsson, Stockholm, Sweden

[21] Appl. No.: 09/009,316

[22] Filed: Jan. 20, 1998

[30] Foreign Application Priority Data

Jan. 21, 1997 [SE] Sweden .................................. 9700167

[51] Int. Cl.⁷ .................................................. H04J 3/06
[52] U.S. Cl. .......................................... 370/509; 375/365
[58] Field of Search .................................... 370/506, 509, 370/535, 512, 513, 503, 510; 375/365, 366, 368

[56] References Cited

U.S. PATENT DOCUMENTS

| | | | |
|---|---|---|---|
| 4,646,329 | 2/1987 | Bojarski | 375/373 |
| 4,651,319 | 3/1987 | Bowlds | 370/535 |
| 5,204,859 | 4/1993 | Paesler et al. | 370/514 |
| 5,400,369 | 3/1995 | Ikemura | 375/368 |
| 5,420,865 | 5/1995 | Swanbery | 370/506 |
| 5,490,147 | 2/1996 | Kubo | 370/509 |
| 5,675,585 | 10/1997 | Bonnot et al. | 714/701 |
| 5,956,377 | 9/1999 | Lang | 375/372 |

FOREIGN PATENT DOCUMENTS

269 974   6/1988   European Pat. Off. .

*Primary Examiner*—Chau Nguyen
*Assistant Examiner*—Suibel M. H. Schuppner
*Attorney, Agent, or Firm*—Burns, Doane, Swecker & Mathis, L.L.P.

[57] ABSTRACT

A method and system align frames of a digital link which interconnects two entities. Frames in which overhead is interleaved with payload are considered. The frame alignment is executed in two phases such that the actual frame alignment, in which a predetermined frame alignment word (FAW) is found, is preceded by a procedure called 'column alignment'. The idea with column alignment is to find the positions for the overhead columns or overhead bits of a pending frame of payload and interleaved overhead. During column alignment the transmitting entity will send an easily detectable column alignment word (CAW) and the receiving entity will quickly recognize the overhead bit positions in the interleaved frame. When the positions for the overhead bits have been detected, the transmitting entity will start to send Normal Frames and the receiving entity will gain final frame alignment by finding the FAW in the overhead bit positions.

17 Claims, 10 Drawing Sheets

TELECOMMUNICATION METHOD AND SYSTEM

This application claims priority under 35 U.S.C. §§119 and/or 365 to 9700167-1 filed in Sweden on Jan. 21, 1997; the entire content of which is hereby incorporated by reference.

BACKGROUND

The present invention generally relates to telecommunication systems and more particularly to frame alignment or frame synchronization of a digital link.

A digital link is generally considered as an interface between entities of a telecommunication network. In particular, a digital link could be an interface between a switch core and units such as multiplexors, and exchange terminals. Data are transmitted on the digital link in time slots that are arranged into frames. When several data channels are multiplexed onto a single transmission facility one of the challenges is to determine the boundary of the frames within the overall combined stream of transmitted data. For the receiving equipment to interpret the data properly, the receiving hardware needs a way of distinguishing the beginning and end of each frame. This is called frame-level synchronization or frame alignment.

A known and common synchronization approach is to have a unique sequence of bits, called frame alignment word (FAW), located at the beginning of each frame. With this basic and simple technique a single starting flag, i.e. the FAW, will allow synchronization.

However, it is desirable to minimize the buffering of information and therefore the frame alignment word (possibly with additional overhead) is interleaved, usually bit by bit, at equidistant intervals together with the payload in the frame. This technique is particularly useful when dealing with large frames.

In general, frames of interleaved payload and overhead are continuously transmitted between entities that are in communication with each other. At lost frame alignment in one of the interconnected entities, that entity starts searching for the interleaved FAW in the frame being received from the other entity, and gains frame alignment upon detection of the FAW.

In this context, a fast frame alignment technique consists in storing a relatively long sequence of payload and interleaved overhead data in a large serial register. In principle, the length of this sequence has to be such that the sequence is capable of containing the complete frame alignment word in its interleaved form. Assume, by way of example, that the overhead is interleaved with payload in such a way that 1 bit of overhead is followed by 11 bits of payload and so on. According to this example, the register must be capable of storing data of at least 12 times the length of the FAW. The stored data bits are evaluated in order to find the frame alignment word. If the FAW is not found in the stored sequence, a next sequence is read and evaluated and so on until the FAW is found. At most, this procedure will require a whole frame before frame alignment is accomplished. The main disadvantage with this prior art technique is that a hardware realization requires a considerable amount of logic circuitry.

Another commonly used technique is to utilize a register of the same length as the frame alignment word itself, in which every n:th bit of the interleaved bit flow is stored, starting at bit x. Here, n represents the interleaving distance. If the FAW is not found in a complete frame, the wrong bits have been considered, and the process is repeated starting at x+1. If the FAW is recovered, then the frame boundary is found; otherwise the process starts over again at x+2 et cetera. In the worst case scenario, this approach will require n complete frames to find the frame alignment word.

U.S. Pat. No. 5,420,865 issued to Swanbery discloses a method and system for aligning non-interleaved frames in start-stop communication between two devices. An all 1's pattern is employed to cause a device that is misaligned to inform the other device of this condition in such a way that the other device is caused to transition into the misaligned state. In addition, all 1's patterns are also used to cause a device in the misaligned state to transition into a realignment state. When in the realignment state the device transmits an end of alignment sequence, which acts as frame alignment word, to cause the other device to transition into an aligned state.

SUMMARY

The present invention reduces the drawbacks of the prior art arrangements.

It is a general object of the present invention to provide fast frame alignment by using a relatively small amount of logic circuitry. In particular, it is the provision of methods and systems for frame alignment to which the invention is directed.

In accordance with a general inventive concept the frame alignment is executed in two phases such that the actual frame alignment is preceded by a procedure called 'column alignment' or 'overhead position detection'. The first phase is the column alignment phase, and the second phase is the actual frame alignment phase in which the frame alignment word, FAW, is found. The idea with column alignment is to find the positions for the overhead columns of a pending frame with payload and interleaved overhead. Consider two entities that are connected to each other by a two-way digital link. During column alignment the transmitting entity will send a Column Alignment Frame (CAF) which preferably comprises logical ones in all bit positions except for the positions of the overhead bits which comprise logical zeros. This frame pattern is easily detectable and the receiving entity will quickly recognize the overhead bit positions in the interleaved frame. When the positions for the overhead bits have been detected, the transmitting entity will start to send Normal Operational Frames (NOF) and the receiving entity will gain final frame alignment by finding the FAW in the overhead bit positions. In practice, in order to gain column alignment, it is sufficient to transmit a predetermined column alignment word or pattern having a predefined bit in a position which corresponds to an overhead bit position in a pending operational frame. Preferably, this column alignment word is successively repeated a suitable number of times in order to obtain higher security against bit errors.

The tools required to find the overhead bit positions are the column alignment pattern and the communication between the entities in connection with the column alignment.

According to a first embodiment of the invention, an additional communication channel, separate from the medium used for data transmission, is employed for the alignment communication. This additional channel may be a radio link or a mutual control system; a CPU that is common for the two entities.

According to exemplary embodiments of the invention, the alignment communication is realized over the same digital link that is used for transmitting data.

The invention affords the following advantages:
Fast frame alignment;
A hardware realization with a minimum of logic circuitry, leading to inexpensive implementations; and
Quick recovery of a link that has been interrupted because of testing or disturbances.

Other advantages offered by the present invention will be appreciated upon reading of the below description of the.

BRIEF DESCRIPTION OF THE DRAWINGS

The novel features believed characteristic of the invention are set forth in the appended claims. The invention itself, however, as well as other features and advantages thereof will be best understood by reference to the detailed description of the specific embodiments which follows, when read in conjunction with the accompanying drawings, wherein:

DETAILED DESCRIPTION OF EMBODIMENTS OF THE INVENTION

The invention considers frames in which overhead is interleaved with payload. The overhead includes a frame alignment word which indicates the 'beginning' of the frame.

The general idea according to the invention is to execute the frame alignment in two phases such that the actual frame alignment is preceded by a procedure called 'column alignment'. The first phase is the column alignment phase in which the positions of the overhead bits of a pending operational frame are recognized. The second phase is the actual frame alignment phase in which the frame alignment word (FAW) is detected in the recognized overhead bits.

In order to understand the basic principle of the invention, an illustrative example of the two phase frame alignment procedure according to a first preferred embodiment of the invention will now be described with reference to FIGS. 1, 2 and 3.

Figure 1:
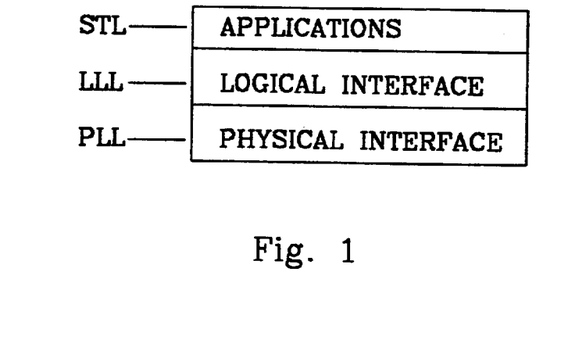
FIG. 1 is a schematic diagram of a digital link represented in a three layer model.

FIG. 1 is a schematic diagram of a digital link represented in a three layer model. The lowest layer is the Physical Link Layer (PLL) which defines the electrical and mechanical properties of the link. The middle layer is the Logical Link Layer (LLL) which organizes the data flow into frames. It also provides functions for maintenance of the link and link terminations. The highest layer is the Switching Termination Layer (STL) which operates and maintains switch termination. The Switching Termination Layer can be defined for different applications, and is normally highly switch dependent.

Figure 2:
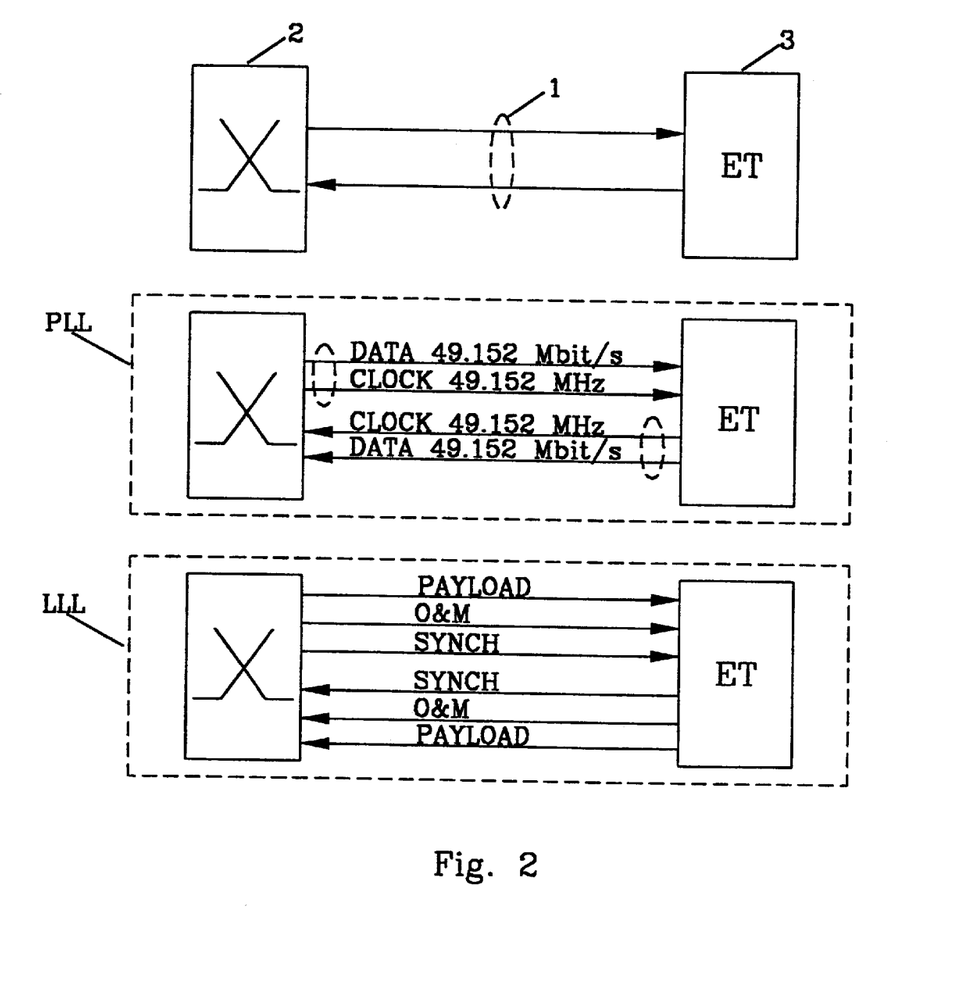
FIG. 2 is a schematic diagram illustrating two entities connected to each other by a two-way digital link.

FIG. 2 is a schematic diagram illustrating two entities interconnected by a two-way digital link. In this particular example, the two-way digital link 1 is used in a telecommunication system as an interface between a group switch 2 on the switch side and an exchange terminal (ET) 3 on the line side. In addition to a simple overall representation of the digital link 1, the link is also shown from the viewpoint of the Physical Link Layer (PLL) and the Logical Link Layer (LLL). The physical interface of the digital link, i.e. the Physical Link Layer (PLL), provides the data paths and clock signals that are necessary to transport bidirectional data. In this example, the physical interface runs at a clock speed of 49.152 Mhz and the digital link is thus capable of transporting data at a bit rate of 49.152 Mbit/s. The Logical Link Layer (LLL) organizes frames that are required to operate and maintain the physical interface of the digital link. The frames generally include payload, overhead and maintenance information (O&M), and synchronization information (SYNCH).

Figure 3:
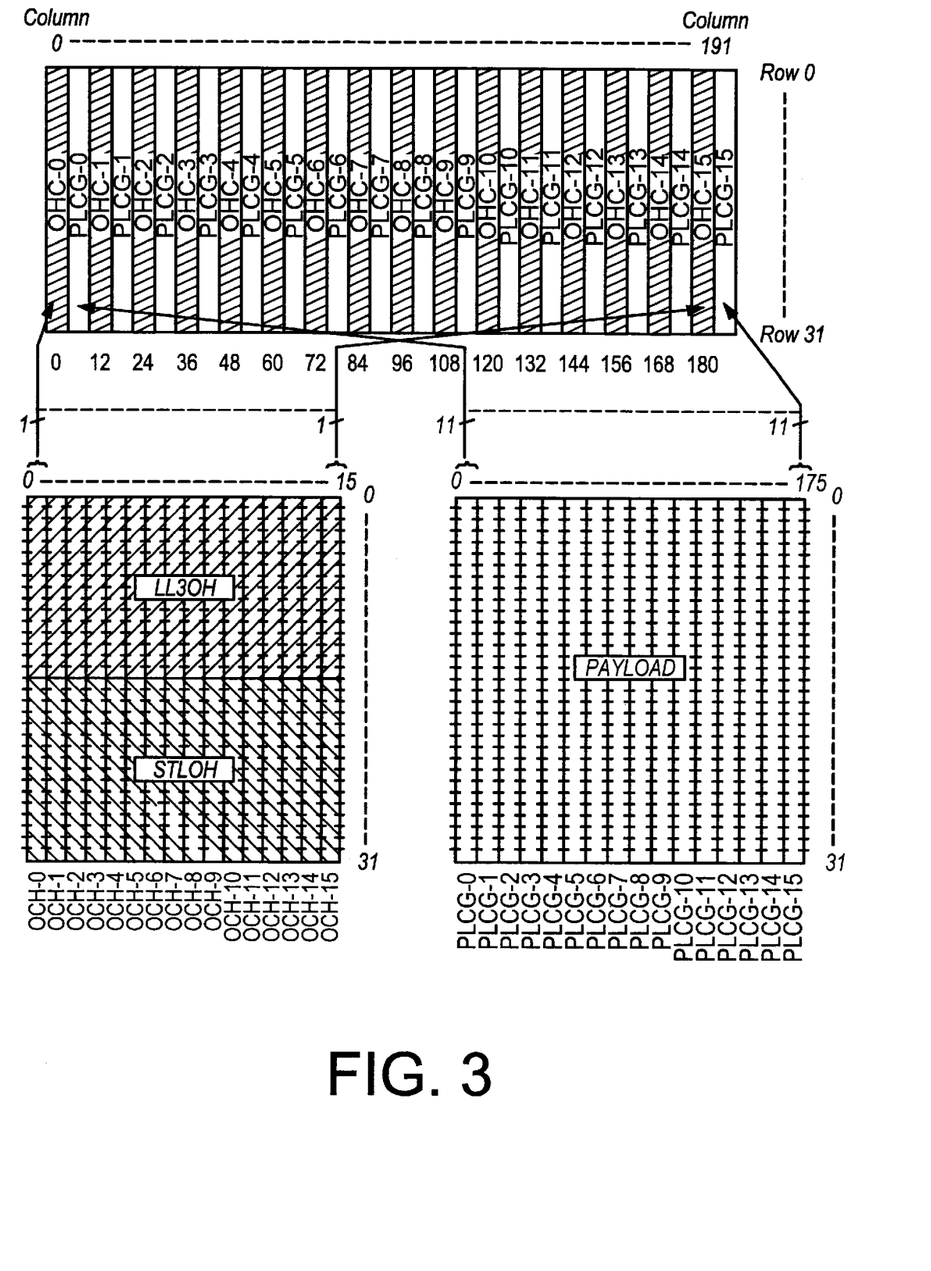
FIG. 3 shows an example of the mapping of payload and overhead into a complete interleaved frame.

The frame format of the Logical Link Layer according to this particular example is shown in FIG. 3 which illustrates an example of the mapping of payload and overhead into a complete frame. The overhead and the payload are arranged respectively into columns according to an ordinary method of representing time slots in a frame. In this example, the complete frame is built up by a 192×32 bits matrix; a relatively long frame. Rows and columns are referred to as row 0-31 and column 0-191. Any bit in the frame is uniquely specified by its row and column according to the following form: [row, column] . [0,0] defines the start of the frame, while [31,191] is defined as the end of the frame. The transmission of the frame starts from [0,0] and continues bit by bit, row by row until [31,191] is reached. The length of the frame is 6144 bits/125 $\mu$s. A 16 by 16 bits field LL3OH, is defined for operation and maintenance of the digital link. For the purpose of operation and maintenance of the Switching Termination Layer, a field STLOH of 16 by 16 bits is reserved. The use of this field is defined by the Switching Termination Layer. An overhead field of 32 rows and 16 columns is defined by concatenating the LL3OH and STLOH fields. The frame alignment word (FAW), typically 16 bits long, is preferably contained in the LL3OH field, and by definition the frame starts at the position of the first bit in the FAW. The carried payload forms a field comprising 32 rows and 176 columns. The complete frame, also referred to as a Normal Operational Frame (NOF), is constructed by interleaving the overhead and the payload column-wise. Starting from the left, the complete frame includes 1 overhead column (OHC-0) followed by a group of 11 payload columns (PLCG-0) and yet another column of overhead (OHC-1), and so forth.

Now with reference to FIG. 2 once again, assume that one of the entities, e.g. the exchange terminal (ET) 3, has lost frame alignment. Frame alignment may be lost for a number of reasons such as high rate of bit errors, checksum errors and interruptions due to testing and/or malfunctions. In this particular example, lost frame alignment is assumed to have occurred if high frequencies of faulty FAW's or CRC-errors are detected. At lost frame alignment, the ET 3 needs to gain frame alignment and communicates this need to the switch. According to the invention, the switch 2 then stops transmitting Normal Operational Frames (NOF) and instead sends a Column Alignment Frame (CAF). The Column Alignment Frame preferably comprises zeros in the overhead positions and logical ones in the payload positions. The precise format of the CAF is not crucial as long as the bit pattern is easily detectable, such that the ET 3 will quickly recognize the overhead bit positions. More particularly, the ET 3 searches for a logical zero "0" in the CAF-pattern, and column alignment is assumed to have been established when the zero is detected. Thus, column alignment will take at most 12 bits because of the CAF-pattern of interleaved logical ones and zeros. The ET 3 has now found the positions at which the overhead bits will be situated when normal frames are subsequently sent, and communicates this fact to the switch. The switch 2 starts transmitting normal frames (NOF) with payload and overhead information again, and the ET 3 will gain final frame alignment by finding the FAW in the overhead positions. The ET 3 searches for the frame alignment word at the overhead bit positions by using a shift register of the length of the frame alignment word, typically 16 bits. The bits in the recognized overhead positions are successively stored and evaluated until the FAW is found. After column alignment, the actual frame alignment can take at most 1 complete frame, since the ET knows where the overhead bits are positioned In this case, the complete frame alignment procedure will require at most 1 frame and 12 bits. This is a fast frame alignment considering the fact that only a 16-bits register have to be used. An improvement from 12 frames for the prior art to 1 frame and 12 bits according to the invention.

Figure 4:
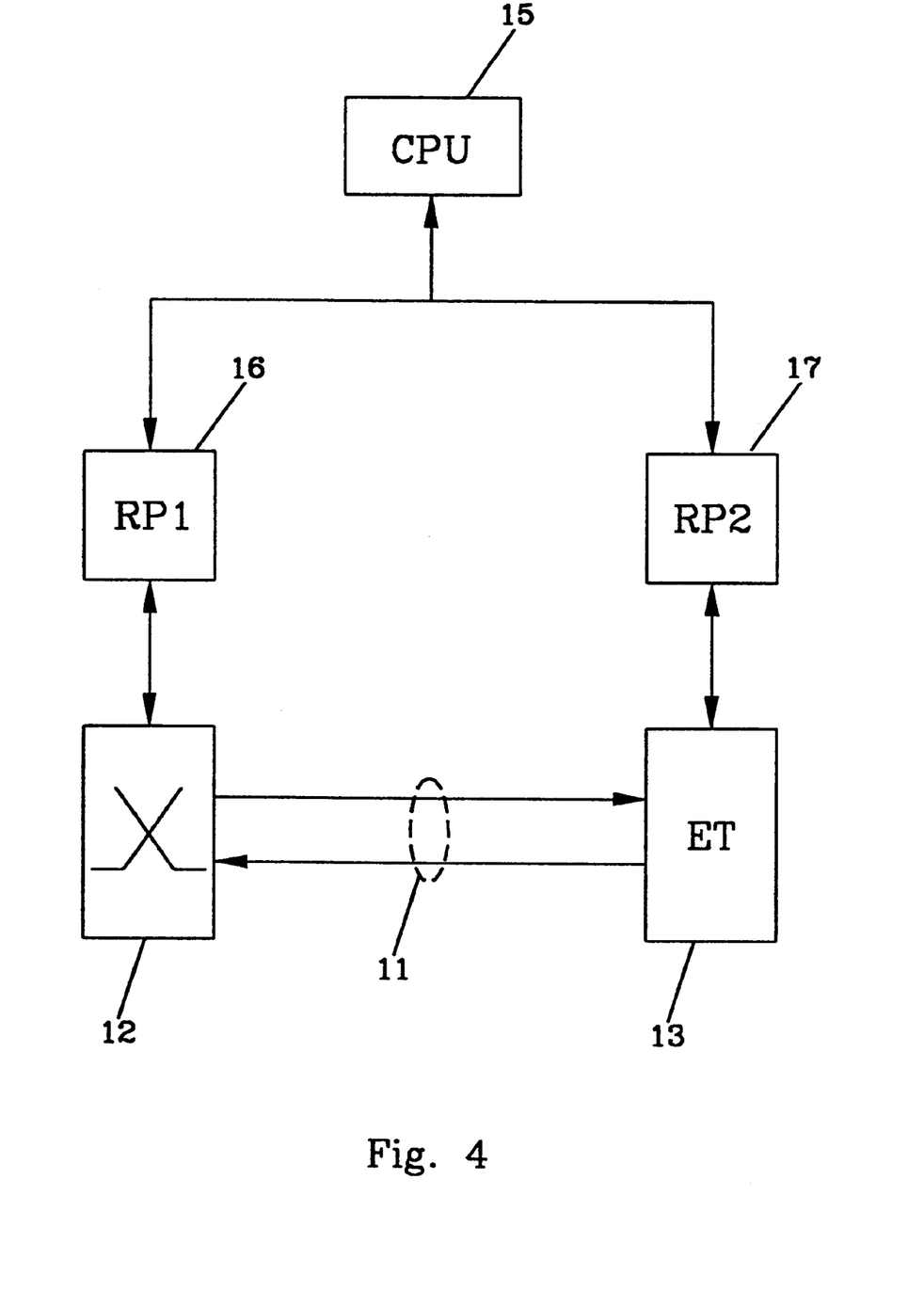
FIG. 4 is a simple schematic drawing illustrating a conventional hierarchical processor system associated with a group switch and an exchange terminal that are interconnected by a digital link.

The aim is to find out where to look for the frame alignment word, i.e. to find the overhead positions, and the tools to accomplish this are the column alignment pattern and the communication between the entities in connection with the column alignment. For example, the entity that has lost frame alignment has to communicate its need for frame alignment to the other entity, and when it has found the positions at which the overhead bits will be situated it has to communicate this fact to the other entity also. In the example given above, the ET 3 may use an additional communication channel, such as a radio link or a mutual control system, separate from the digital link 1 for this alignment communication. In a telecommunication network, it is possible to utilize the mutual control or processor system thereof as communication channel. Viewed as a communication channel, the processor system is of course slower than the digital link. FIG. 4 is a simple schematic drawing illustrating a conventional hierarchical processor system associated with a group switch 12 and an exchange terminal (ET) 13 that are connected to each other by a digital link 11. The hierarchical processor system comprises a central processor (CPU) 15 and two regional processors (RP), a first RP 16 and a second RP 17. The group switch 12 is connected to the first RP 16 which in turn is connected to the CPU 15. The ET 13 is connected to the second RP 17 which is also connected to the CPU 15. At lost frame alignment, the ET 13 sends an appropriate need for frame alignment signal through the hierarchical processor structure to the group switch 12 communicating that it needs to gain frame alignment, and when the ET 13 has found the overhead positions in the CAF-pattern the ET 13 sends an appropriate OH-position detection signal through the processor system to the switch 12 communicating this fact.

A more elaborate and advantageous realization of the frame alignment procedure according to the invention, and the alignment communication between the entities in particular, will be described below.

Figure 5:
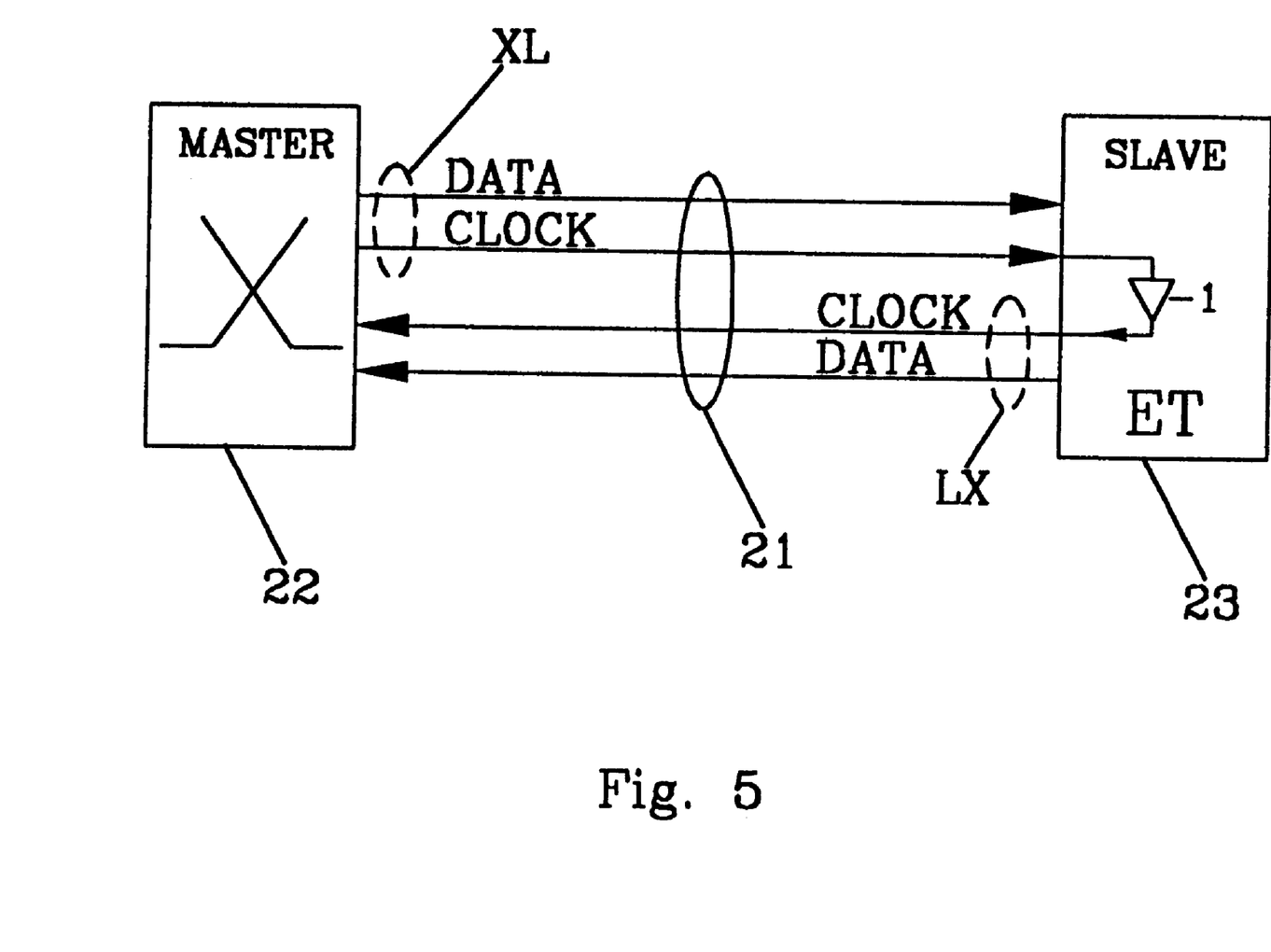
FIG. 5 is a schematic diagram of a simple and illustrative master-and-slave configuration of two entities interconnected by a two-way digital link.
Figure 6:
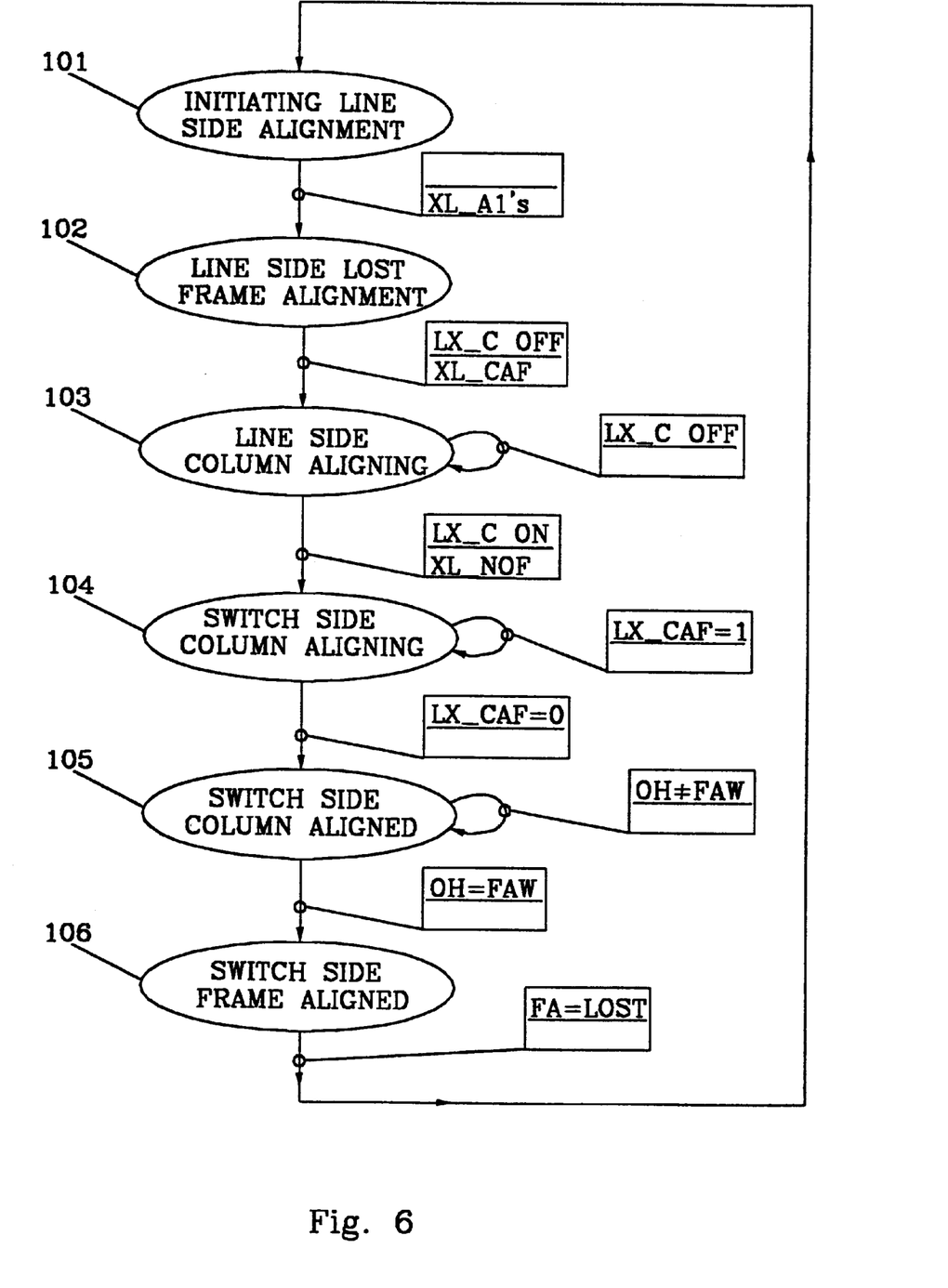
FIG. 6 is a schematic state diagram of the alignment procedure on the switch side (master)
Figure 7:
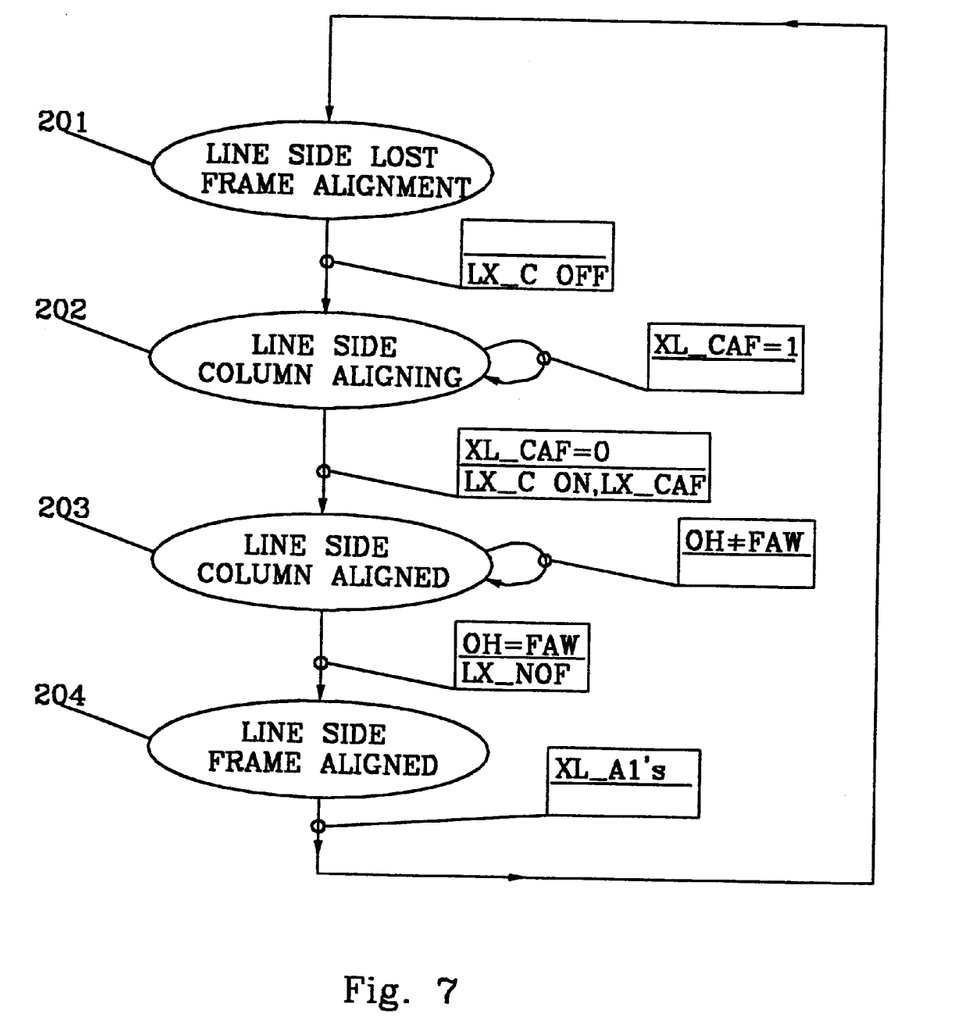
FIG. 7 is a schematic state diagram of the alignment procedure on the line side (slave)

With the intention of giving an illustration of a second embodiment of the invention, a master-and-slave system is considered. The column alignment procedure of the overall frame alignment procedure is coordinated from the master. FIG. 5 is a schematic diagram of a simple and illustrative master-and-slave configuration with a group switch 22 acting as master and an ET 23 acting as slave. The switch 22 and the ET 23 are interconnected by a bidirectional digital link 21. Hereinafter, the switch to line direction is denoted XL, and the line to switch direction is denoted LX. A clock unit (not shown) is provided in the group switch 22 for clock signal generation. The clock signal from the switch 22 to the ET 23, i.e. the XL-clock, originates directly from the clock unit in the switch 22. The clock signal from the ET 23 towards the switch 22, i.e. the LX-clock, originates from the XL-clock as an inverted copy thereof. In other words, the generated clock signal is sent from the switch 22 to the ET 23, and inverted in the ET 23 and fed back to the switch 22. FIGS. 6 and 7 are schematic state diagrams of the alignment procedure on the switch side (master) and line side (slave), respectively. In general, ellipses indicate states, and line arrows represent transitions between states. The condition for a transition as well as the action in connection with the transition are indicated in boxes with the following notation:
Condition
Action Furthermore, the following abbreviations are used in the state diagrams of FIGS. 6 and 7:

| | |
|---|---|
| XL_A1's | All 1's pattern in the XL-direction |
| LX_C ON/OFF | The clock signal in the LX-direction1 On or Off |
| XL_CAF | Column Alignment Frame in the XL-direction |
| LX_CAF | Column Alignment Frame in the LX-direction |
| XL_NOF | Normal Operational Frame in the XL-direction |
| LX_NOF | Normal Operational Frame in the LX-direction |
| OH ≠ FAW | Frame Alignment Word not detected |
| OH = FAW | Frame Alignment Word detected |
| FA = LOST | Frame Alignment is lost |

In the below description of the second preferred embodiment of the invention, reference will be made to the block diagram of FIG. 5, the state diagram of FIG. 6 as well as the state diagram of FIG. 7. In general, at lost frame alignment on one side, the other side is caused to loose frame alignment such that the link is taken down in both directions before recommencing a new frame alignment. At lost frame alignment (FA=LOST) on the switch side, the switch 22 transitions into the state 101 (FIG. 6) and line side alignment is initiated. The switch 22 sends an all ones pattern (XL_A1's) together with the XL-clock signal towards the ET 23. This action on the switch side will cause the line side to loose its frame alignment, and the switch transitions to the state 102 (FIG. 6). At lost frame alignment 201 (FIG. 7) on the line side, the ET 23 shuts the clock towards the switch side off (LX_C OFF) until column alignment on the line side has been re-established. The switch side detects that it does not have any clock from the line side (LX_C OFF), and initiates the column alignment procedure by transmitting a Column Alignment Frame (XL_CAF) of the type given above towards the line side. In other words, line side column alignment in state 103 (FIG. 6) is initiated from the switch side. The line side will quickly recognize the column alignment pattern, and the line side, in the column aligning state 202 (FIG. 7), is forced to search for a "0" in the XL_CAF. When column alignment has been completed on the line side (XL_CAF=0), i.e. when the line side is column aligned in state 203 (FIG. 7), both clock (LX_C ON) and a CAF-pattern (LX_CAF) are transmitted from the line side towards the switch side. When the clock from the line side re-appears at the switch side (LX_C ON), a transition from state 103 to state 104 (FIG. 6) takes place and a Normal Operational Frame (XL_NOF) is transmitted towards the line side while search for column alignment is started at the switch side in the column aligning state 104 (FIG. 6). Now, on the line side, in the column aligned state 203 (FIG. 7), the line side starts searching for the frame alignment word in the overhead bit positions of the normal frame (XL_NOF) received from the switch side. When the FAW has been detected (OH=FAW) on the line side such that the line side transitions into the frame aligned state 204 (FIG. 7), NOF-frames are transmitted from the line side towards the switch side (LX_NOF). The switch side starts searching for the FAW in these NOF-frames. It is thus assumed that the switch side has detected a "0" in the column alignment pattern from the line side (LX_CAF=0) and transitioned into the column aligned state 105 (FIG. 6), as the FAW is detected on the line side. This is a reasonable assumption since it takes at least one row to find the FAW in the overhead positions of the XL_NOF-frame on the line side. In that time, several logical zeros in the LX_CAF-pattern transmitted towards switch should have reached the switch side for detection. Final frame alignment on the switch side is gained by finding the FAW in the overhead positions of the LX_NOF-frame (OH=FAW). The switch 22 then transitions to the frame aligned state 106 (FIG. 6).

It should be noted, that in a master-and-slave implementation, the column alignment procedure on the switch or master side is different from that on the line or slave side. In particular, it should be understood that the overall alignment procedure is coordinated from the master, and that the slave communicates that it needs to gain frame alignment by shutting the clock towards the master off (LX_C OFF), and further communicates that it is column aligned by starting to send the clock to the master again (LX_C ON).

If the line side looses frame alignment before the switch side, the overall alignment procedure will start in state 201 of FIG. 7. In this case, state 101 and the transition to state 102 will not be considered. By shutting the clock towards the switch off (LX_C OFF), the line side communicates to the switch side that it needs to gain frame alignment, and at the same time it causes the switch side to loose frame alignment.

Figure 8:
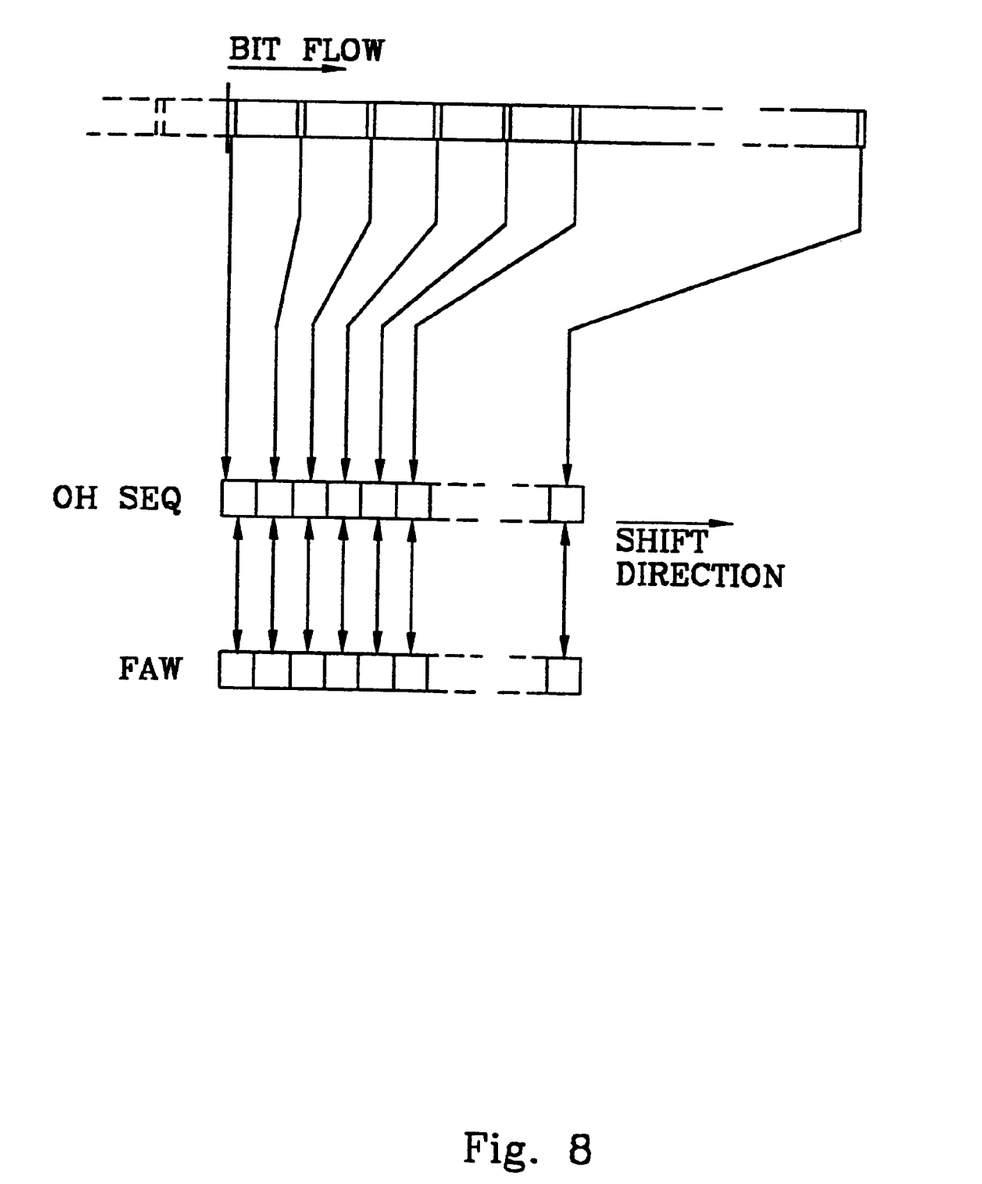
FIG. 8 is a schematic drawing illustrating the process of finding the frame alignment word in the overhead bits.

FIG. 8 is a schematic drawing illustrating the process of finding the frame alignment word in the overhead bits. Once the overhead bit positions are found, the overhead bits OH are easily extracted from the bit flow of interleaved payload and overhead since the interleaving distance is known. The overhead bits OH are extracted as they are received, and once a sequence OH SEQ of extracted overhead bits having the same length as the frame alignment word FAW is obtained, these overhead bits are compared to the bits of the FAW to see if the overhead sequence OH SEQ matches the FAW. If not, the rightmost bit of the overhead sequence OH SEQ is shifted out of the sequence and when the next overhead bit OH in the bit flow is received, it will be extracted and shifted into the overhead sequence OH SEQ from the left. The procedure continues until the FAW is found in the overhead sequence OH SEQ.

In an alternative embodiment of the invention, the group switch and the ET are not related to each other as master and slave. Instead, the switch side and the line side cooperate on an equal basis. Preferably, each entity has its own clock unit. At lost frame alignment on one side, the other side is caused to loose frame alignment. This is effected by either sending an all 1's pattern to the other side or by shutting the clock towards that side off. At the same time, a need for frame alignment is communicated to the other side. In response to such a need for frame alignment communication, the other side starts transmitting a CAF-pattern, and the column alignment procedure is initiated. Of course, it is also possible to use a separate communication link as described above in connection with FIG. 5.

It should be understood from the above description of the column alignment procedure that it is generally not necessary to transmit a complete Column Alignment Frame in order to gain column alignment. In practice, column alignment is assumed to have been established when a logical zero "0" in the CAF-pattern is detected. Accordingly, because of the CAF-pattern of interleaved logical ones and zeros, with an interleaving distance of n bits, column alignment should take at most n bits. In fact, it is possible to employ any bit pattern or bit sequence which enables the recognition of the positions at which the overhead bits will be situated when normal frames are sent. In other words, it is enough to send a synchronization pattern, acting as a column alignment word (CAW), with a predefined bit position which corresponds to an overhead bit position in a pending normal frame. However, in order to prevent bit errors from rendering the recognition of the overhead bit position impossible, the column alignment word is normally repeated a suitable number of times. Column alignment is alternatively defined as established when two or more consecutive overhead positions or CAW's have been found such that a higher security against bit errors is obtained. The CAF-pattern specified above is a special case of a column alignment word, coded as "0111111111111111", which is repeated over a complete frame. Another example of a column alignment word is "1000000000000000".

In the actual frame alignment procedure, frame alignment may be assumed to have been established after a number of consecutive correct FAW's have been detected. If the FAW sequence is broken, the FAW is preferably released and column alignment is restarted. Further, if no FAW is found within a predetermined number of frames after column alignment has been achieved, it is generally feasible to initiate a new column alignment.

It is also possible for the FAW to alternate between a specific sequence in one frame and another sequence in a subsequent frame. In accordance with a preferred embodiment of the present invention, final frame alignment is gained by means of an alternating FAW together with a CRC-11 check calculated over the previous frame. Preferably, the frame alignment word alternates between FAW1, coded as "1111110101000000" in one frame, and FAW2, coded as "0000001010111111" in the subsequent frame. The CRC-11 check additionally secures detection of unacceptable bit error rates.

Figure 9:
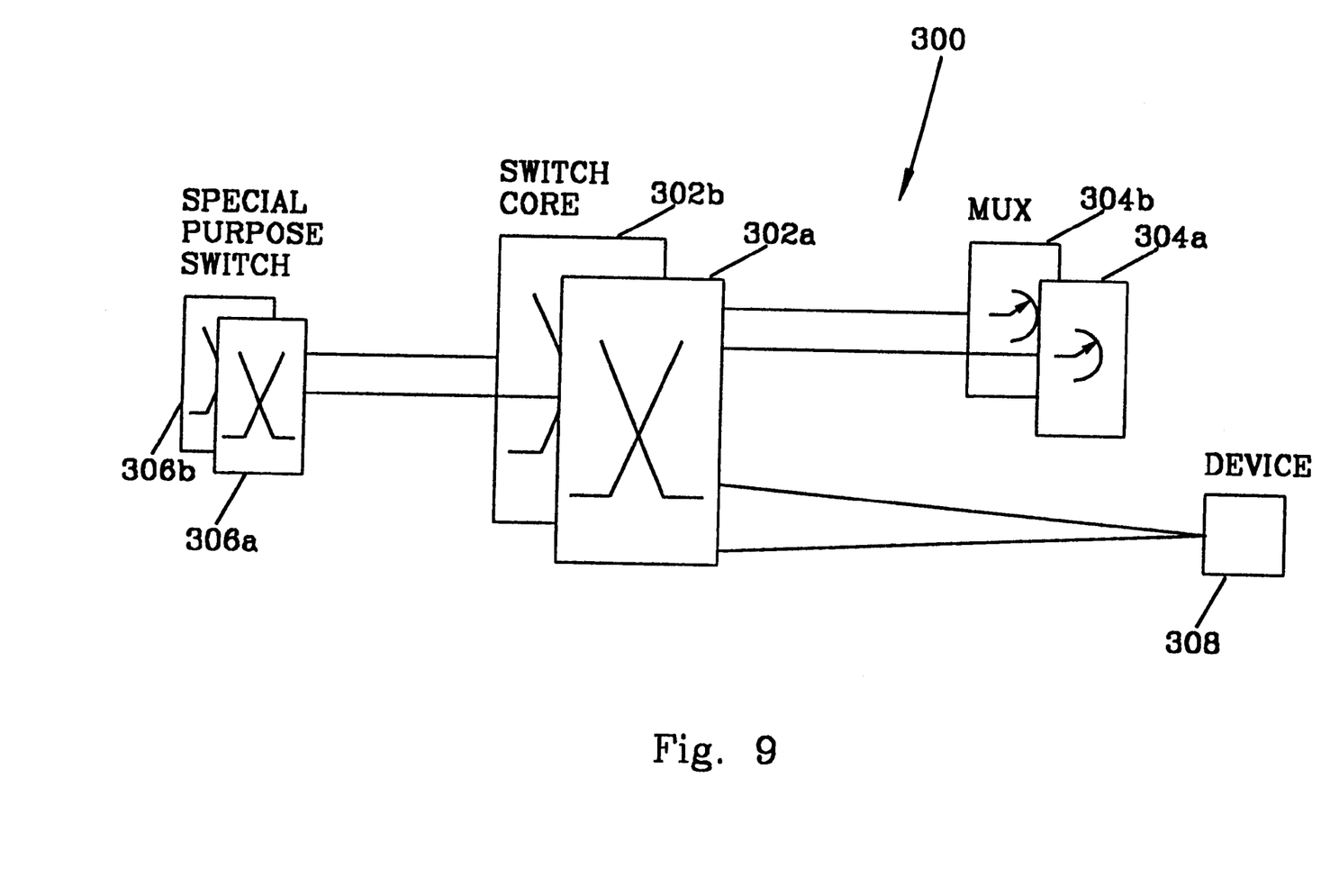
FIG. 9 illustrates an example of a system configuration in which a number of units are connected to a duplicated switch core structure.

Examples of units on the line side other than exchange terminals are multiplexors, tone equipment or even special purpose switches. FIG. 8 illustrates an example of a system configuration in which such units are connected to a duplicated switch core structure. The system 300 comprises a duplicated switch core 302a, 302b, a duplicated multiplexer 304a, 304b, a duplicated special purpose switch 306a, 306b and a device 308 such as a tone transceiver. Each one of the duplicated structures 302, 304, 306 has two planes a and b. The structures are duplicated for reasons of reliability. At failure in one plane, the other plane takes over. The switch core 302 is connected to the multiplexer 304 by a first link interface, to the special purpose switch 306 by a second link interface and to the device 308 by a third link interface. The duplication generally means that the each one of the link interfaces includes two bidirectional digital links, one for each plane. In these bidirectional digital links, frame alignment is gained by means of the two-phase frame alignment procedure according to the invention.

An example of a detailed hardware realization of the two-phase frame alignment method according to the invention will be described below in connection with FIGS. 10 and 11. Consider a master-and-slave system with a master and a slave interconnected by a bidirectional digital link. First, the circuit realization on master' side will be described, and then the realization on the slave side will be described. The master side circuitry and the slave side circuitry interacts in correspondence with the state diagrams of FIGS. 6 and 7, and together constitute a complete frame alignment system.

Figure 10:
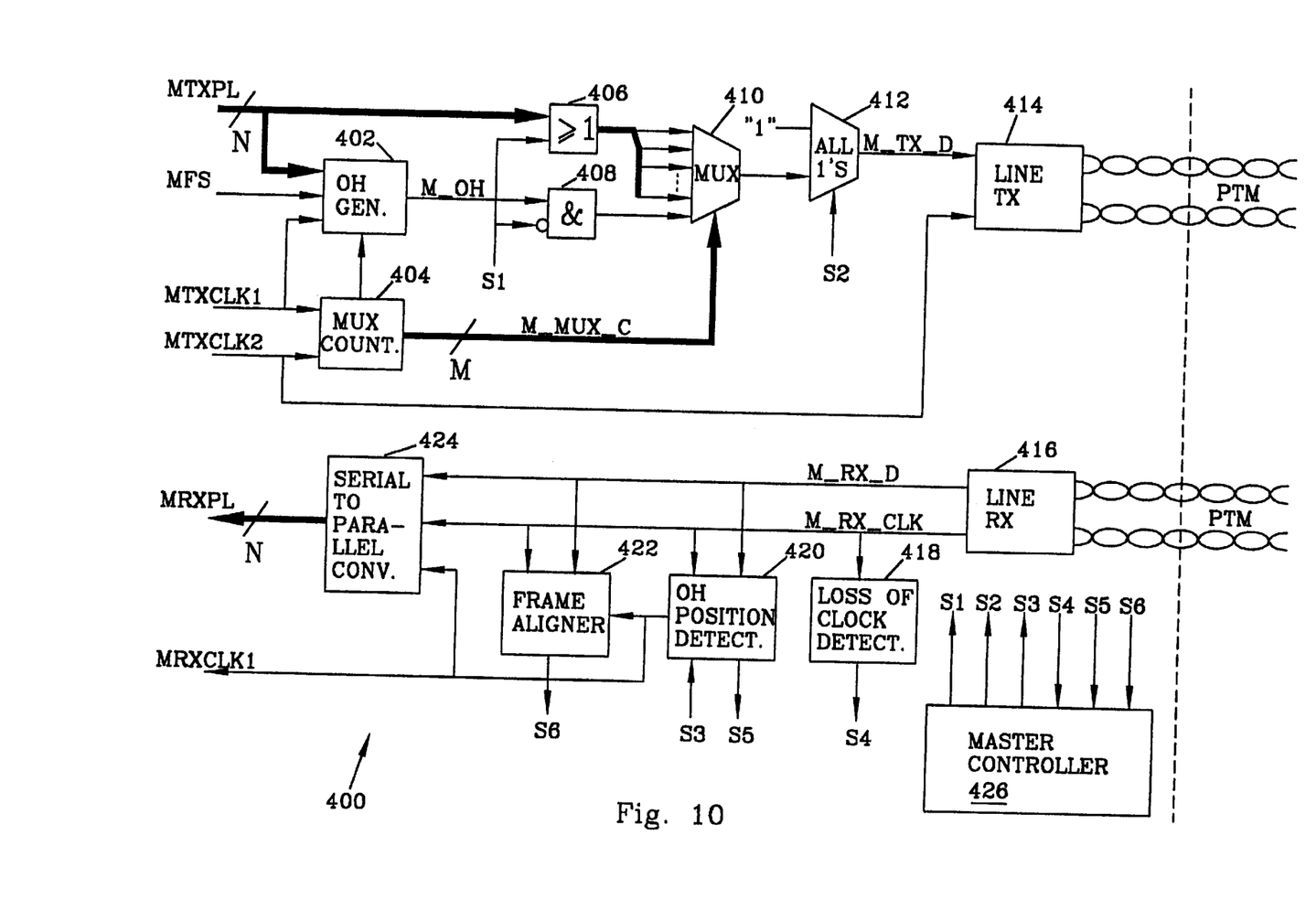
FIG. 10 is a schematic block diagram of circuitry on the master side realizing the state diagram of FIG. 6.

FIG. 10 is a schematic block diagram of circuitry on the master side realizing the state diagram of FIG. 6. The master side circuitry 400 comprises an overhead generator 402, a multiplexor counter 404, an OR-gate 406, an AND-gate 408, a multiplexor 410, an all 1's generator 412, a line transmitter 414, a line receiver 416, a loss of clock detector 418, an overhead position detector 420, a frame aligner 422, a serial-to-parallel converter 424, and a master controller 426.

The master side circuitry 400 has the following external signal interface:

| | |
|---|---|
| MTXPL: | Master side Transmit Payload - Payload to be transmitted to the slave side. The payload is carried on a parallel interface comprising N parallel signals, where N is the predetermined interleaving distance. |
| MFS: | Master side Frame Synch pulse - Indicates the starting position of the frame. |
| MTXCLK1: | Master side Transmit Clock 1 - Indicates the rate by which MTXPL is updated. It also indicates the rate by which the overhead is interleaved in the final frame. |
| MTXCLK2: | Master side Transmit Clock 2 - Indicates the clock rate of the transmission link. |
| MRXPL: | Master side Receive Payload - Payload from the slave side. |
| MRXCLK1: | Master side Receive Clock 1 - Indicates the rate by which MRXPL is updated. |

The following control signals and indication signals are produced and received by the master controller 426:

| | | |
|---|---|---|
| S1 = M_CAF_CONTROL: | | Controls the CAF-generation on the master side. |
| S2 = A1'S_CONTROL: | | Controls the generation of the all 1's pattern. |
| S3 = M_OH_SEARCH: | | Initiates search for the OH-positions on the master side. |
| S4 = CLK_STATE: | | Indicates the state (absent/present) of the clock signal from the slave side. |
| S5 = M_OH_FOUND: | | Indicates that the OH-positions are found on the master side. |
| S6 = M_FRAME_AL: | | Indicates that frame alignment has been gained on the master side. |

The overhead generator 402 generates FAW and a CRC-checksum. The timing of generating the FAW and CRC is controlled by the signals MFS and MTXCLK1. The CRC-checksum is formed based on the payload MTXPL. The generated overhead M_OH is passed to the multiplexor (MUX) 410 via the AND-gate 408. The AND-gate 408, controlled by the control signal S1, is utilized to set the overhead bits to "0" when a column alignment frame (CAF) is to be transmitted.

The payload, carried on MTXPL, is passed to the MUX 410 via the OR-gate 406. The OR-gate 406, controlled by the control signal S1, is utilized to set the payload bits to "1" when a CAF-frame is to be transmitted.

The multiplexor counter 404 generates control signals M_MUX_C to the MUX 410. The control signals M_MUX_C comprises M parallel signals, sufficient to address N+1 MUX input terminals. The phase of the counter 404 is controlled by MTXCLK1 and MTXCLK2.

The MUX 410 multiplexes payload and overhead into frames of interleaved payload and overhead, and outputs a signal of either normal operational frame (NOF) data, or column alignment frame (CAF) data. If the control signal S1 is active, CAF-frames will be generated; otherwise NOF-frames will be generated.

The output signal of the MUX 410 is passed to the all one's (A1's) generator 412. In its simplest form, the A1's generator 412 is a switch which is responsive to either the output signal of the MUX 410 or a signal of all digital one's. Although the all one's signal is illustrated as being external to the A1's generator 412, the A1's generator 412 preferably comprises a signal generator for producing the all one's signal. When the control signal S2 is active, the A1's generator 412 is forced to output the all one's signal instead of the NOF/CAF-signal from the MUX 410.

The output signal M_TX_D (Master side Transmission Data), either a NOF/CAF-frame or an A1's pattern, of the A1's generator 412 is passed to the line transmitter 414, which also receives the MTXCLK2-clock. The line transmitter 414 adapts the clock signal and the data signal to the physical transmission medium PTM, and transmits clock and data to the slave side.

The line receiver 416 receives clock and data from the slave side and retrieves the clock signal M_RX_CLK and the data signal M_RX_D from the physical transmission medium PTM.

The loss of clock detector 418 detects a lost clock signal from the slave side. The detector 418 signals, by the signal S4, the state (absent/present) of the clock signal from the slave side to the master controller 426. When the clock signal is lost, the master side starts transmitting CAF-frames to the slave, and when the clock signal re-appears, the master side starts transmitting NOF-frames to the slave.

The overhead position detector 420 searches for the overhead positions when a CAF-frame is being received from the slave side. The OH-position detector 420 is activated by the control signal S3, at re-appearance of the clock signal from the slave side. When an OH-position is found, an indication signal S5 is sent to the master controller 426. In addition, a continuous clock signal MRXCLK1, indicating the OH-position, is generated and passed to the frame aligner 422 and the serial-to-parallel converter 424.

The frame aligner 422, implementing the functionality of FIG. 8 by means of shift register, fix register and comparing circuitry, detects the frame alignment word in the NOF-frames received from the slave side. Further, the frame aligner calculates a CRC-checksum, and final frame alignment on the master side is normally based on detection of an alternating FAW and a correct CRC-checksum.

The serial-to-parallel converter 424 is responsive to the data signal M_RX_D, the clock signal M_RX_CLK and the OH-position indicating clock signal MRXCLK1 and converts M_RX_D into a parallel interface of N parallel payload signals.

Figure 11:
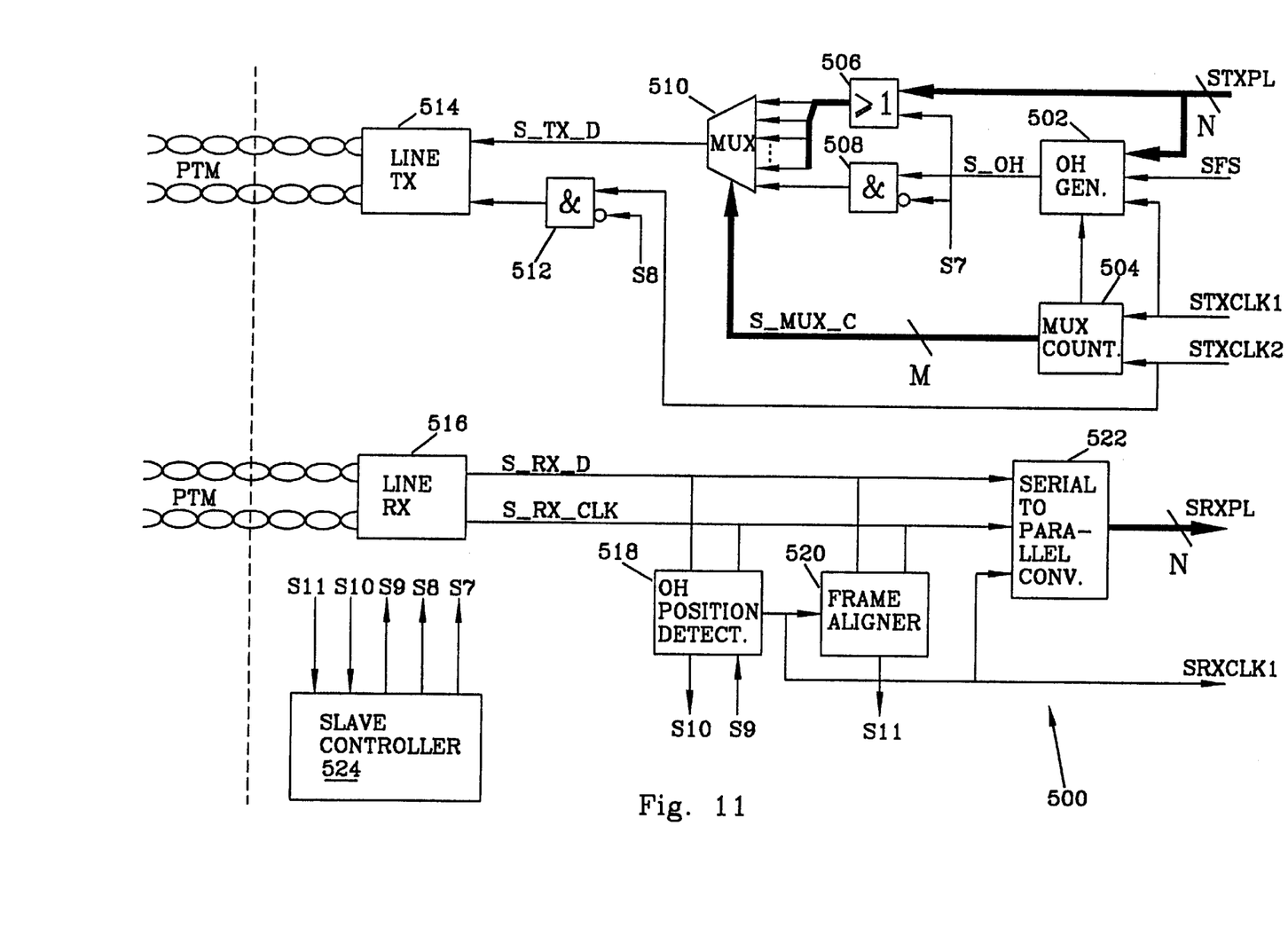
FIG. 11 is a schematic block diagram of circuitry on the slave side realizing the state diagram of FIG. 7.

FIG. 11 is a schematic block diagram of circuitry on the line or slave side realizing the state diagram of FIG. 7. The circuitry 500 of FIG. 11 comprises an overhead generator 502, a multiplexor counter 504, an OR-gate 506, a first AND-gate 508, a multiplexor 510, a second AND-gate 512, a line transmitter 514, a line receiver 516, an overhead position detector 518, a frame aligner 520, a serial-to-parallel converter 522, and a slave controller 524.

The slave side circuitry 500 has the following external signal interface:

| | |
|---|---|
| STXPL: | Slave side Transmit Payload - Payload to be transmitted to the master side. The payload is carried on a parallel interface comprising N parallel signals, where N is the interleaving distance. |
| SFS: | Slave side Frame Synch pulse - Indicates the starting position of the frame. |
| STXCLK1: | Slave side Transmit Clock 1 - Indicates the rate by which STXPL is updated. It also indicates the rate by which the overhead is interleaved in the final frame. |
| STXCLK2: | Slave side Transmit Clock 2 - Indicates the clock rate of the transmission link. |
| SRXPL: | Slave side Receive Payload - Payload from the slave side. |
| SRXCLK1: | Slave side Receive Clock 1 - Indicates the rate by which SRXPL is updated. |

The following control and indication signals are produced and received by the slave controller 524:

| | | |
|---|---|---|
| S7 = S_CAF_CONTROL: | | Controls the CAF-generation on the slave side. |
| S8 = CLK_CONTROL: | | Controls the clock signal to be transmitted from the slave side. |
| S9 = S_OH_SEARCH: | | Initiates search for the OH-positions on the slave side. |
| S10 = S_OH_FOUND: | | Indicates that the OH-positions are found on the slave side. |
| S11 = S_FRAME AL: | | Indicates that frame alignment has been gained on the slave side. |

The overhead generator 502 generates FAW and a CRC-checksum. The timing of generating the FAW and CRC is controlled by the signals SFS and STXCLK1. The CRC-checksum is formed based on the payload STXPL. The generated overhead S_OH is passed to the multiplexor (MUX) 510 via the first AND-gate 508. The first AND-gate 508, controlled by the control signal S7, is utilized to set the overhead bits to "0" when a column alignment frame (CAF) is to be transmitted.

The payload, carried on STXPL, is passed to the MUX 510 via the OR-gate 506. The OR-gate 506, controlled by the control signal S7, is utilized to set the payload bits to "1" when a CAF-frame is to be transmitted.

The multiplexor counter 504 generates control signals S_MUX_C to the MUX 510. The control signals S_MUX_C comprises M parallel signals, sufficient to address N+1 MUX input terminals. The phase of the counter 504 is controlled by STXCLK1 and STXCLK2.

The MUX 510 multiplexes payload and overhead into frames of interleaved payload and overhead, and outputs a signal of either normal operational frame (NOF) data, or column alignment frame (CAF) data. If the control signal S7 is active, CAF-frames will be generated; otherwise NOF-frames will be generated.

The second AND-gate 512 receives the clock signal STXCLK2, and a control signal S8. If the control signal S8 is active, the STXCLK2 clock will be shut off (since the output will be all logical zeros); otherwise the second AND-gate 512 will be transparent and the STXCLK2 clock will be passed through unchanged. At lost frame alignment on the line side, the STXCLK2 clock will be shut off until column alignment has been reestablished on the line side.

The output signal S_TX_D (Slave side Transmission Data) of the MUX 510 is passed to the line transmitter 514, which also receives the output signal of the second AND-gate 512. The line transmitter 514 adapts the clock signal and the data signal to the physical transmission medium PTM, and transmits clock and data to the master side.

The line receiver 516 receives clock and data from the master side and retrieves the clock signal S_RX_CLK and the data signal S_RX_D from the physical transmission medium PTM.

The overhead position detector 518 searches for the overhead positions when a CAF-frame is being received from the master side. The OH-position detector 518 is activated by the control signal S9, at reception of a CAF-frame from the master side. When an OH-position is found, an indication signal S10 is sent to the slave controller 524. In addition, a continuous clock signal SRXCLK1, indicating the OH-position, is generated and passed to the frame aligner 520 and the serial-to-parallel converter 522.

The frame aligner 520, implementing the functionality of FIG. 8 by means of shift register and fix register circuitry, detects the frame alignment word in the NOF-frames received from the master side. Further, the frame aligner 520 calculates a CRC-checksum. Final frame alignment on the slave side is normally based on detection of an alternating FAW and a correct CRC-checksum.

The serial-to-parallel converter 522 is responsive to the data signal S_RX_D, the clock signal S_RX_CLK and the OH-position indicating clock signal SRXCLK1 and converts S_RX_D into a parallel interface of N parallel payload signals.

The embodiments described above are merely given as examples, and it should be understood that the present invention is not limited thereto. It is of course possible to embody the invention in specific forms other than those described without departing from the spirit of the invention. Further modifications and improvements which retain the basic underlying principles disclosed and claimed herein are within the scope and spirit of the invention.

What is claimed is:

1. A method for aligning frames of information transmitted on a link between a first entity and a second entity, each frame comprising payload and overhead information interleaved with each other at regular intervals and the overhead information including a frame alignment word, comprising the steps of:

at lost frame alignment in one of the entities, causing the other entity to lose frame alignment;

the first entity communicating a need for frame alignment to the second entity;

the second entity transmitting at least one first synchronization word having a first predefined bit in a position which corresponds to an overhead bit position in a first pending frame to the first entity, in response to said need for frame alignment communication;

the first entity searching for and detecting said first predefined bit received from the second entity, whereby the overhead positions in said first pending frame from the second entity are recognized; communicating that said first predefined bit has been detected to the second entity; and transmitting at least one second synchronization word having a second predefined bit in a position which corresponds to an overhead bit position in a second pending frame to the second entity;

the second entity transmitting said first frame to the first entity in response to said bit detection communication; searching for and detecting said second predefined bit received from the first entity, whereby the overhead positions in said second pending frame from the first entity are recognized; and the first entity searching for and detecting the frame alignment word in the recognized overhead positions of said first frame received from the second entity, whereby frame alignment is gained in the first entity, and transmitting said second frame to the second entity;

the second entity searching for and detecting the frame alignment word in the recognized overhead positions of said second frame received from the first entity, whereby frame alignment is gained in the second entity.

2. A method for aligning frames according to claim 1, wherein clock signals are transmitted on the link between the entities, and said step of the first entity communicating a need for frame alignment comprises the step of shutting the clock signal towards the second entity off, and said step of the first entity communicating that said first predefined bit has been detected comprises the step of resuming the transmission of the clock signal towards the second entity.

3. A method for aligning frames according to claim 1, wherein an additional communication channel is provided between the entities, and said step of the first entity communicating a need for frame alignment comprises the step of sending a need for frame alignment signal on the additional communication channel to the second entity, and said step of the first entity communicating that said first predefined bit has been detected comprises the step of sending a bit detection signal on the additional communication channel to the second entity.

4. A method for aligning frames according to claim 1, wherein said steps, for the first entity as well as for the second entity, of searching for and detecting the frame alignment word comprises the steps of:

successively storing the bits of the recognized overhead positions; and detecting the frame alignment word by evaluating at least one sequence of said stored bits, said sequence having the same length as the frame alignment word.

5. A method for gaining frame alignment in a first entity which is in communication with a second entity, wherein a frame comprises payload and overhead information interleaved with each other at regular intervals, and the overhead information includes a frame alignment word, said method comprising the steps of:

the first entity communicating a need for frame alignment to the second entity;

the second entity transmitting at least one synchronization word having a predefined bit in a position which corresponds to an overhead bit position in a pending frame, to the first entity;

the first entity searching for and detecting said predefined bit of said synchronization word such that the overhead positions in a pending frame are recognized;

the first entity communicating that said predefined bit has been detected to the second entity;

the second entity transmitting said frame to the first entity; and the first entity searching for and detecting the frame alignment word in the recognized overhead positions of said frame, whereby frame alignment is gained.

6. A method for gaining frame alignment according to claim 5, wherein said step of searching for and detecting the frame alignment word comprises the steps of:

successively storing the bits of the recognized overhead positions of said frame; and detecting the frame alignment word by evaluating at least one sequence of said stored bits, said sequence having the same length as the frame alignment word.

7. A method for gaining frame alignment in a device which is in communication with a telecommunication switch, wherein a frame of information comprises payload and overhead interleaved with each other at regular intervals such that the frame is representable in the form of interleaved payload and overhead columns, the overhead including a frame alignment word, said method comprising the steps of:

the device communicating a need for frame alignment to the switch;

the switch transmitting a column alignment frame having bits of a first logic state in the payload columns and bits of a second logic state in the overhead columns, to the device, in response to said need for frame alignment communication;

the device searching for and detecting a bit of said second logic state in said column alignment frame such that the overhead columns in a pending frame are recognized;

the device communicating that column alignment has been gained to the switch, in response to the detection of said bit of said second logic state;

the switch transmitting said frame to the device in response to said communication of column alignment; and the device searching for and detecting the frame alignment word in the recognized overhead columns of said frame received from the switch, whereby final frame alignment is gained.

8. A system for aligning frames of information transmitted on a link between a first entity and a second entity, each frame comprising payload and overhead information interleaved with each other at regular intervals and the overhead information including a frame alignment word, comprising:

in the first entity, means for communicating a need for frame alignment to the second entity;

in the second entity, means for transmitting at least one first synchronization word having a first predefined bit in a position which corresponds to an overhead bit position in a first pending frame to the first entity, in response to said need for frame alignment communication;

in the first entity, means for searching for and detecting said first predefined bit received from the second entity, whereby the overhead positions in said first pending frame from the second entity are recognized; means for communicating that said first predefined bit has been detected to the second entity; and means for transmitting at least one second synchronization word having a second predefined bit in a position which corresponds to an overhead bit position in a second pending frame to the second entity;

in the second entity, means for transmitting said first frame to the first entity in response to said bit detection communication; means for searching for and detecting said second predefined bit received from the first entity, whereby the overhead positions in said second pending frame from the first entity are recognized; and in the first entity, means for searching for and detecting the frame alignment word in the recognized overhead positions of said first frame received from the second entity, whereby frame alignment is gained in the first entity, and means for transmitting said second frame to the second entity;

in the second entity, means for searching for and detecting the frame alignment word in the recognized overhead positions of said second frame received from the first entity, whereby frame alignment is gained in the second entity.

9. A system for aligning frames according to claim 8, wherein clock signals are transmitted on the link between the entities, and said means for communicating a need for frame alignment comprises means for shutting the clock signal towards the second entity off, and said means for communicating that said first predefined bit has been detected comprises means for resuming the transmission of the clock signal towards the second entity.

10. A system for aligning frames according to claim 8, wherein an additional communication channel is provided between the entities, and said means for communicating a need for frame alignment comprises means for sending a need for frame alignment signal on the additional communication channel to the second entity, and said means for communicating that said first predefined bit has been detected comprises means for sending a bit detection signal on the additional communication channel to the second entity.

11. A system for aligning frames according to claim 8, wherein said means for searching for and detecting the frame alignment word comprises:

a first register for storing said frame alignment word;

a shift register of the same length as the first register for successively storing the bits of the recognized overhead positions; and means for comparing the frame alignment word stored in said first register with the bits stored in said shift register.

12. A system for aligning frames according to claim 8, further comprising means for causing at least one of the entities to lose frame alignment.

13. A system for gaining frame alignment in a first entity which is interconnected to a second entity by a link, wherein a frame comprises payload and overhead information interleaved with each other at regular intervals, and the overhead information includes a frame alignment word, said system comprising:

in the first entity, means for communicating a need for frame alignment to the second entity;

in the second entity, means for transmitting at least one synchronization word having a predefined bit in a position which corresponds to an overhead bit position in a pending frame, to the first entity;

in the first entity, means for searching for and detecting said predefined bit of said synchronization word such that the overhead positions in a pending frame are recognized; means for communicating that said predefined bit has been detected to the second entity;

in the second entity, means for transmitting said frame to the first entity; and in the first entity, means for searching for and detecting the frame alignment word in the recognized overhead positions of said frame, whereby frame alignment is gained.

14. A system for gaining frame alignment according to claim 13, wherein said means for searching for and detecting the frame alignment word comprises:

a first register for storing said frame alignment word;

a shift register of the same length as the first register for successively storing the bits of the recognized overhead positions; and means for comparing the frame alignment word stored in said first register with the bits stored in said shift register.

15. A system for gaining frame alignment according to claim 13, wherein clock signals are transmitted on the link between the entities, and said means for communicating a need for frame alignment comprises means for shutting the clock signal towards the second entity off, and said means for communicating that said first predefined bit has been detected comprises means for resuming the transmission of the clock signal towards the second entity.

16. A system for gaining frame alignment according to claim 13, wherein an additional communication channel is provided between the entities, and said means for communicating a need for frame alignment comprises means for sending a need for frame alignment signal on the additional communication channel to the second entity, and said means for communicating that said first predefined bit has been detected comprises means for sending a bit detection signal on the additional communication channel to the second entity.

17. A system for gaining frame alignment in a device which is in communication with a telecommunication switch, wherein a frame of information comprises payload and overhead interleaved with each other at regular intervals such that the frame is representable in the form of interleaved payload and overhead columns, the overhead including a frame alignment word, said system comprising:

in the device, means for communicating a need for frame alignment to the switch;

in the switch, means for transmitting a column alignment frame having bits of a first logic state in the payload columns and bits of a second logic state in the overhead columns to the device, in response to said need for frame alignment communication;

in the device, means for searching for and detecting a bit of said second logic state in said column alignment frame such that the overhead columns in a pending frame are recognized; and means for communicating that column alignment has been gained to the switch, in response to the detection of said bit of said second logic state;

in the switch, means for transmitting said frame to the device in response to said communication of column alignment; and in the device, means for searching for and detecting the frame alignment word in the recognized overhead columns of said frame received from the switch, whereby final frame alignment is gained.

* * * * *